United States Patent
Lin

(10) Patent No.: US 8,657,719 B2
(45) Date of Patent: Feb. 25, 2014

(54) CLUTCH FOR A ROTARY DRIVE DEVICE

(76) Inventor: Yen-Tang Lin, Taichung (TW)

( * ) Notice: Subject to any disclaimer, the term of this patent is extended or adjusted under 35 U.S.C. 154(b) by 405 days.

(21) Appl. No.: 13/087,368

(22) Filed: Apr. 14, 2011

(65) Prior Publication Data

US 2012/0261226 A1 Oct. 18, 2012

(51) Int. Cl.
*F16H 3/44* (2006.01)
(52) U.S. Cl.
USPC .................................. 475/297; 192/105 CD
(58) Field of Classification Search
USPC ......................................................... 475/279
See application file for complete search history.

(56) References Cited

U.S. PATENT DOCUMENTS 4,732,054 A * 3/1988 Takamiya et al. ............. 475/166

* cited by examiner

*Primary Examiner* — Erin D Bishop

(57) ABSTRACT

A clutch for a rotary drive device includes a rotary plate synchronously rotated with a sun gear of a planetary gear set, at least one pawl pivotally mounted onto the rotary plate, an engaging ring sleeved on the rotary plate and surrounding the at least one pawl, and a drive plate co-axially and rotatably mounted onto the rotary plate and abutting against the engaging ring. The planetary gear set is repeatedly operated and the pawls is automatically engaged to/disengaged from the drive plate for reducing noise during operating and lengthening the use life of the clutch for a rotary drive device.

7 Claims, 4 Drawing Sheets

CLUTCH FOR A ROTARY DRIVE DEVICE

BACKGROUND OF THE INVENTION

1. Field of the Invention

The present invention relates to a clutch, and more particularly to a clutch for a rotary drive device.

2. Description of Related Art

A conventional spin apparatus for a mop uses an intermittent driving method and a one-way clutch to rotate the spin apparatus to cast water from the mop. However, the one-way clutch may fall out of order due to water or dust. Water oxidizes the one-way clutch. Dust wears away the one-way clutch.

The present invention has arisen to mitigate and/or obviate the disadvantages of the conventional drive method of a centrifugal water separator for mop.

SUMMARY OF THE INVENTION

The main objective of the present invention is to provide an improved clutch for a rotary drive device.

To achieve the objective, the clutch in accordance with the present invention comprises a rotary plate adapted to be synchronously rotated with a sun gear of a planetary gear set and at least one pawl pivotally mounted onto the rotary plate. An engaging ring is sleeved on the rotary plate the at least one pawl. A drive plate is co-axially and rotatably mounted onto the rotary plate and abuts against the engaging ring. The drive plate is adapted to drive an output structure. A casing is provided for receiving the rotary plate, the at least one pawl, the engaging ring and the drive plate, so that there is friction between the engaging ring and an internal face of the casing. The rotary plate is rotated with the sun gear when the planetary gear set is driven and the pawl is outwardly wiggled to engage and drive the drive plate due to the centrifugal force from the rotating rotary plate centrifugation. When the rotary plate is stopped, the engaging ring continues to rotate relative to the rotary plate due to inertia and the continually rotating engaging ring inwardly pokes the at least one pawl to disengage the at least one pawl from the drive plate.

The planetary gear set is repeatedly operated and the pawls is automatically engaged with or disengaged from the drive plate for reducing noise during operation and lengthening the life of the clutch.

Further benefits and advantages of the present invention will become apparent after a careful reading of the detailed description with appropriate reference to the accompanying drawings.

DETAILED DESCRIPTION OF THE INVENTION

Figure 1:
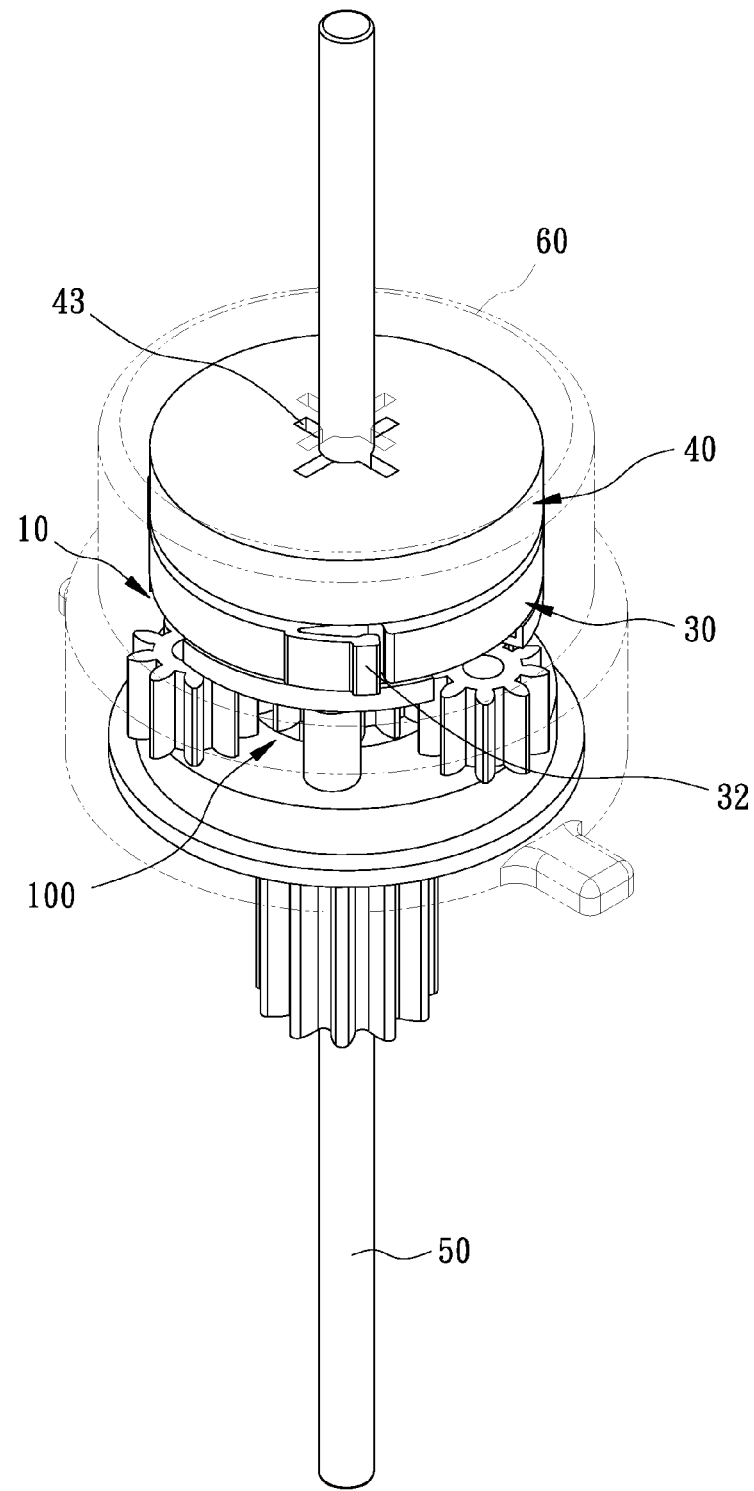
FIG. 1 is a perspective view of a clutch for a rotary drive device in accordance with the present invention.
Figure 2:
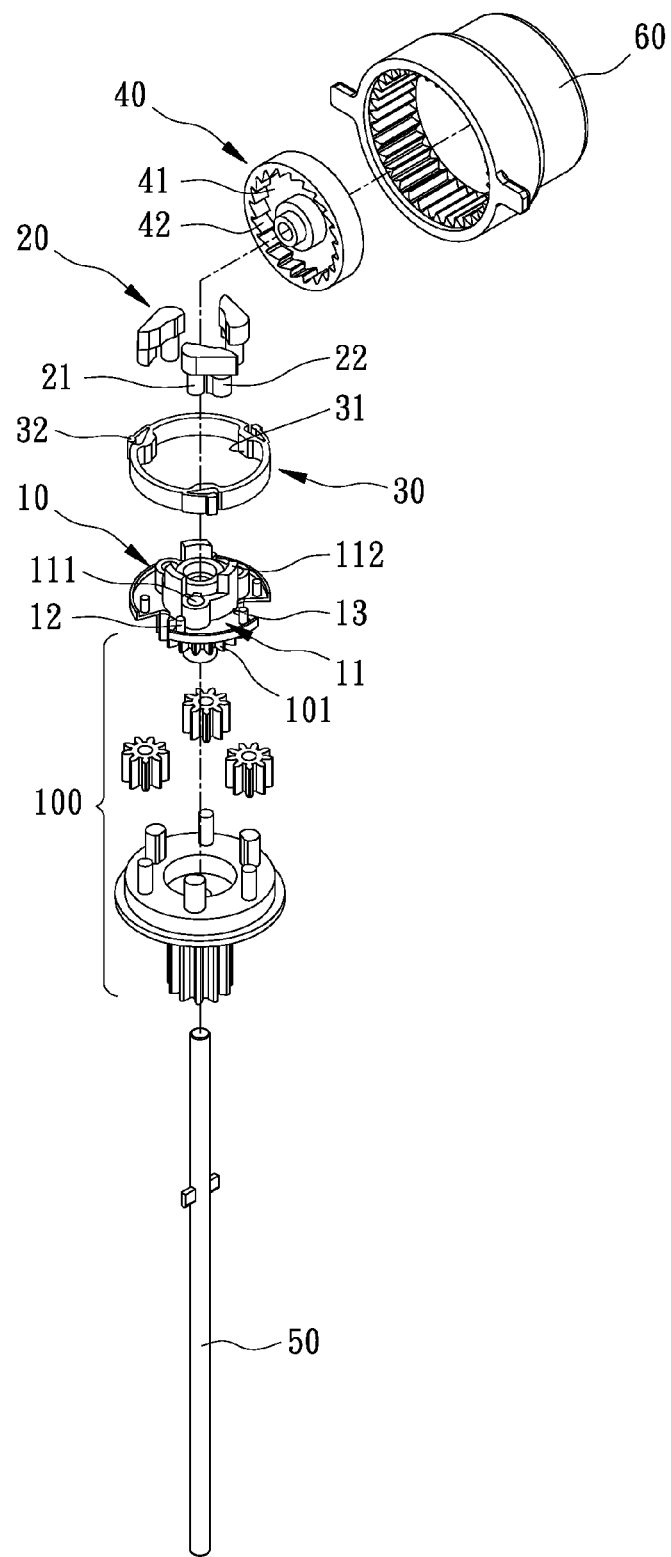
FIG. 2 is an exploded perspective view of the clutch for a rotary drive device in FIG. 1.

Referring to the drawings and initially to FIGS. 1 and 2, a clutch for a rotary drive device in accordance with the present invention comprises a rotary plate (10) synchronously rotated with a sun gear (101) of a planetary gear set (100), at least one pawl (20) pivotally mounted onto the rotary plate (10), an engaging ring (30) sleeved on the rotary plate (10) around the at least one pawl (20), and a drive plate (40) co-axially and rotatably mounted onto the rotary plate (10) against the engaging ring (30). The rotary plate (10) is rotated with the sun gear (101) when the planetary gear set (100) is driven and the pawl (20) is outwardly wiggled to engage and drive the drive plate (40) due to the centrifugal force from the rotating rotary plate. The rotating drive plate (40) is provided to drive an output structure (50). In the preferred embodiment of the present invention, the output structure (50) is a shaft that centrally extends through the drive plate (40) and is radially engaged to the drive plate (40). The engaging ring (30) continues to rotate relative to the rotary plate (10) due to inertia when the rotary plate (10) is stopped. The continually rotating engaging ring (30) inwardly pokes the at least one pawl (20) to disengage the at least one pawl (20) from the drive plate (40).

The rotary plate (10) includes at least one pivot seat (11) longitudinally extending therefrom. In the preferred embodiment of the present invention, the rotary plate (10) has three pivot seats (11) extending therefrom and each having a corresponding pawl (20) mounted thereon for accurately driving the drive plate (40). The pivot seat (11) has a hole (111) longitudinally defined in a first end thereof and a stopper (112) longitudinally extending from a second end thereof. The rotary plate (10) includes first stubs (12) corresponding to the holes (11) and second stubs (13) corresponding to the stoppers (112).

The pawl (20) has a pivot (21) and a raised stub (22) longitudinally extending from two opposite ends of a lower portion of the pawl (20), and each pivot (21) is pivotally received in a corresponding one of the holes (111). The pawl (20) is selectively wiggled to due to the centrifugal force from the rotating rotary plate centrifugation.

The clutch in accordance with the present invention further comprises a casing (60) for containing the rotary plate (10), the pawls (20), the engaging ring (30) and the drive plate (40). The engaging ring (30) is selectively rotated relative to the rotary plate (10) due to friction between the engaging ring (30) and the an internal face of the casing (60). The engaging ring (30) has at least one protrusion (31) inwardly extending from an internal face. The quantity of the protrusion (31) is equal to that of the pawl (20) and the protrusion (31) is moved between the first stub (12) and the second stub (13) to inwardly push the pawl (20) against the stopper (112). Accordingly, the engaging ring (30) has three protrusions (31) each engaged with the raised stub (22) of a corresponding one of the pawls (20) to inwardly poke the corresponding pawl (20) and disengage the pawls (20) from the drive plate (40). The engaging ring (30) has multiple resilient plates (32) extending from an external face. The resilient plates (32) press against the internal face of the casing (60) to enhance the friction between the engaging ring (30) and the casing (60) and operate the engaging ring (30) accurately relative to the rotary plate (10).

The drive plate (40) has a recess (41) centrally defined therein for receiving the pawls (20). A series of ratchets (42) is peripherally formed in the recess, wherein the pawls (20) are selectively engaged to the series of ratchets (42) for driving the drive plate with the output structure (50). A driving structure (43) is centrally formed in the drive plate (40) for driving the output structure. In the preferred embodiment of the present invention, the drive structure (43) is a cruciform hole.

Figure 3:
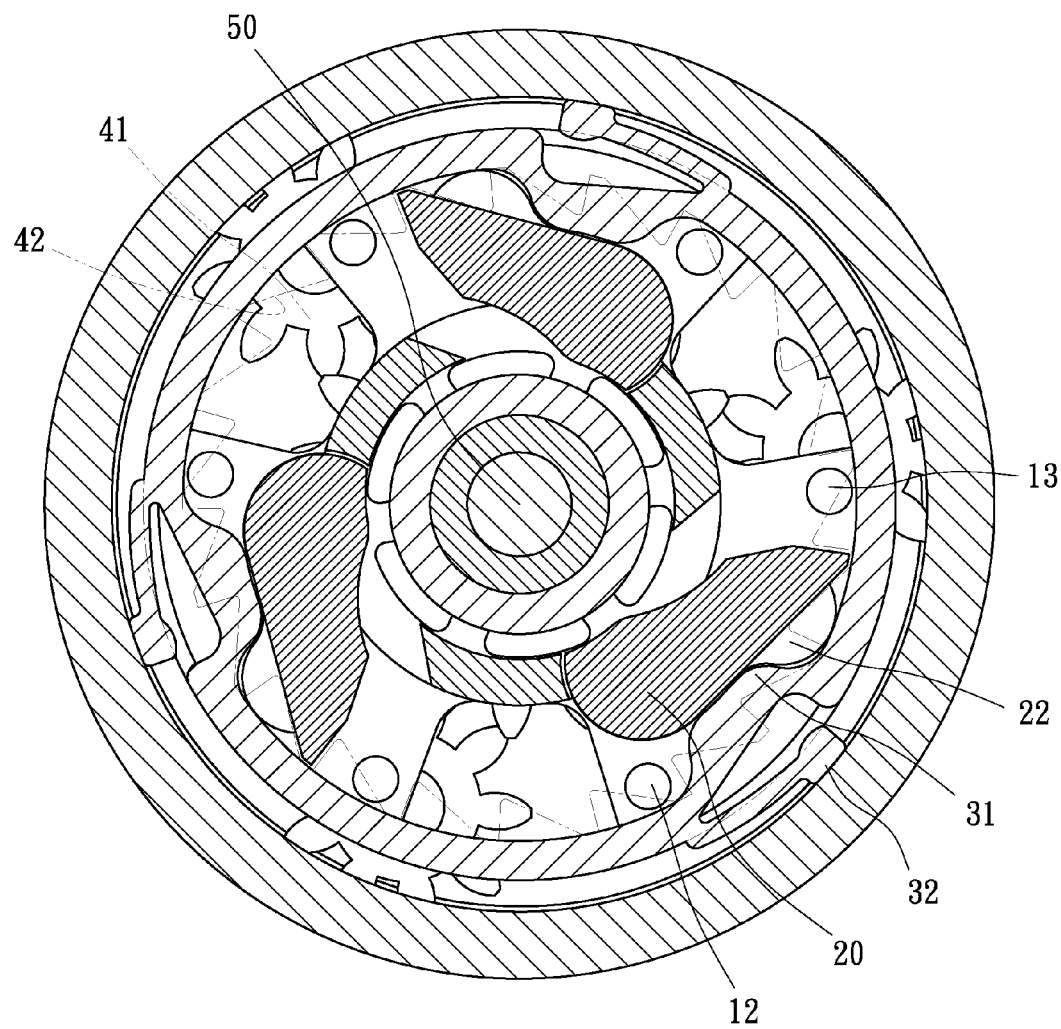
FIG. 3 is a first operational view of the clutch for a rotary drive device in accordance with the present invention.
Figure 4:
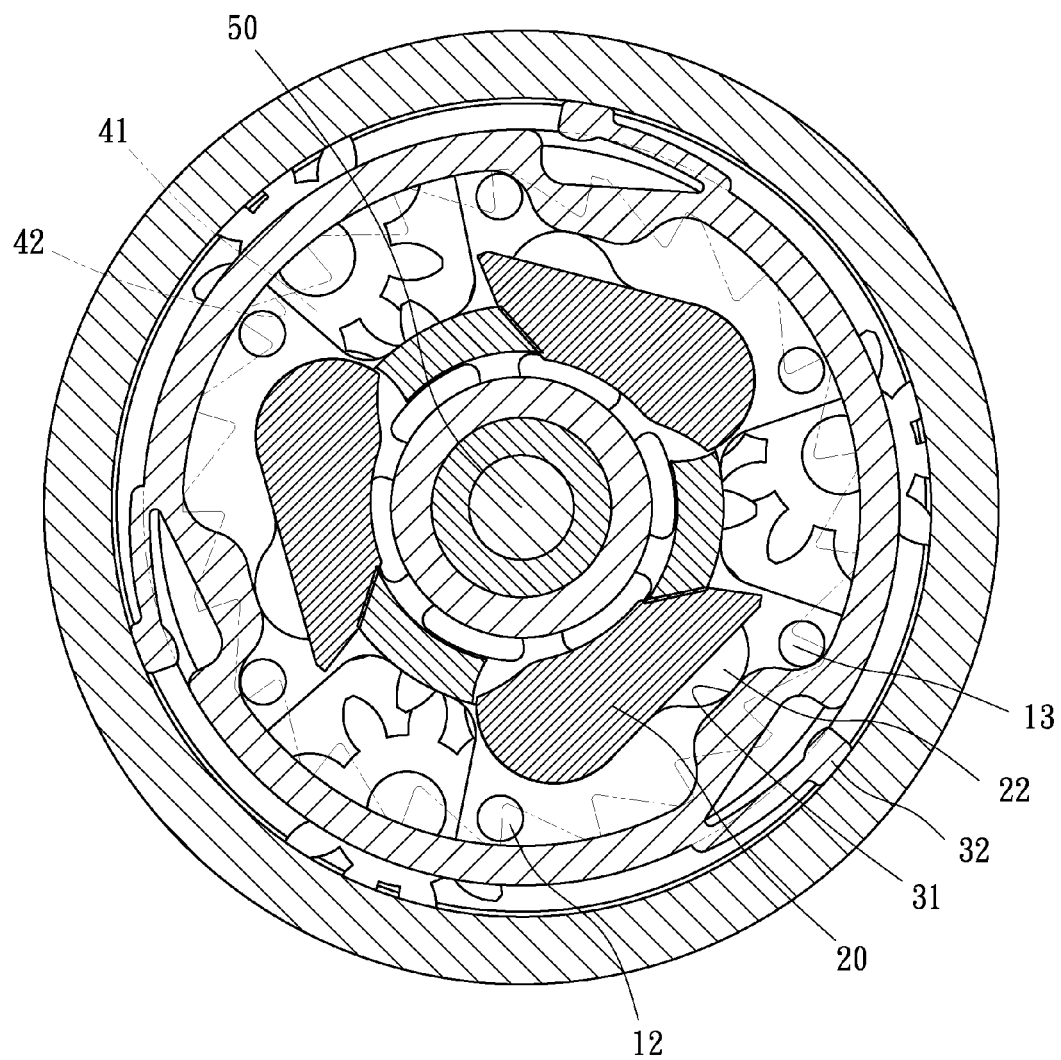
FIG. 4 is a second operational view of the clutch for a rotary drive device in accordance with the present invention.

With reference to FIG. 3, the rotary plate (10) is rotated with the sun gear (101) when the planetary gear set (100) is operated. The engaging ring (30) is temporarily stable due to the friction between it and the casing (60) when the rotary plate (10) starts to rotate. Consequently, the raised stub (22) of each of the pawls (20) is disengaged from the protrusion (31) of the engaging ring (30) and each pawl (20) is outwardly wiggled to engage to the ratchets (42) for driving the drive plate (40) with the output structure due to the centrifugal force from the rotating rotary plate centrifugation. With reference to FIG. 4, the engaging ring (30) continues to rotate due to the inertia thereof when the force acted on the planetary gear set (100) is stopped. Consequently, each protrusion (31) of the continually rotating engaging ring (30) engage with the corresponding raised stub (22) to inwardly poke the pawls (20) and disengage the pawls (20) from the series of ratchets (42) of the drive plate (40). In addition, the drive plate (40) and the output structure (50) continue to rotate. The planetary gear set (100) is repeatedly operated and the pawls (20) are automatically engaged with or disengaged from the drive plate (40) for reducing noise during operation and lengthening the life of the clutch for a rotary drive device.

Although the invention has been explained in relation to its preferred embodiment, it is to be understood that many other possible modifications and variations can be made without departing from the spirit and scope of the invention as hereinafter claimed.

What is claimed is:

1. A clutch for a rotary drive device, comprising:
   a rotary plate adapted to be synchronously rotated with a sun gear of a planetary gear set;
   at least one pawl pivotally mounted onto the rotary plate;
   an engaging ring sleeved on the rotary plate around the at least one pawl;
   a drive plate co-axially and rotatably mounted onto the rotary plate against the engaging ring, wherein the drive plate is adapted to drive an output structure; and
   a casing provided for receiving the rotary plate, the at least one pawl, the engaging ring and the drive plate so that there is friction between the engaging ring and the casing;
   whereby:
   the rotary plate is rotated with the sun gear when the planetary gear set is driven and the pawl is outwardly wiggled to engage and drive the drive plate due to a centrifugal force from the rotating rotary plate; and
   when the rotary plate is stopped, the engaging ring continues to rotate relative to the rotary plate due to inertia and the continually rotating engaging ring inwardly pokes the at least one pawl to disengage the at least one pawl from the drive plate.

2. The clutch as claimed in claim 1, wherein the rotary plate (10) includes at least one pivot seat longitudinally extending therefrom, the at least one pivot seat having a hole longitudinally defined in a first end of the at least one pivot seat and a stopper longitudinally extending from a second end of the at least one pivot seat, wherein the rotary plate includes at least one first stub corresponding to the hole and at least one second stub corresponding to the stopper.

3. The clutch as claimed in claim 2, wherein the at least one pawl includes a pivot and a raised stub respectively longitudinally extending from two opposite ends of a lower portion of the at least one pawl, wherein the pivot is pivotally received in the hole such that the at least one pawl is selectively wiggled due to the centrifugal force from the rotating rotary plate.

4. The clutch as claimed in claim 3, wherein the engaging ring is selectively rotated relative to the rotary plate due to the friction between the engaging ring and the casing, the engaging ring having at least one protrusion inwardly extending from an internal face of the engaging ring, wherein the engaging ring is moved between the first stub and the second stub to inwardly push the pawl against the stopper, wherein the protrusion is selectively engaged with the raised stub of the at least one pawl to inwardly poke the pawl and disengage the pawl from the drive plate.

5. The clutch as claimed in claim 1, wherein the drive plate includes a recess for receiving the at least one pawl and a series of ratchets peripherally formed in the recess, wherein the at least one pawl is selectively engaged with the series of ratchets to drive the drive plate.

6. The clutch as claimed in claim 5, wherein the engaging ring includes multiple resilient plates outwardly extending therefrom so that the resilient plates press against the casing to enhance the friction between the engaging ring and the casing and operate the engaging ring accurately relative to the rotary plate.

7. The clutch as claimed in claim 1, wherein the engaging ring includes multiple resilient plates outwardly extending therefrom so that the resilient plates press against the casing to enhance the friction between the engaging ring and the casing and operate the engaging ring accurately relative to the rotary plate.

* * * * *